US012639980B2

(12) United States Patent
Qin et al.

(10) Patent No.: US 12,639,980 B2
(45) Date of Patent: May 26, 2026

(54) USER EYE MODEL MATCH DETECTION

(71) Applicant: Apple Inc., Cupertino, CA (US)

(72) Inventors: Hao Qin, Saratoga, CA (US); Hua Gao, San Jose, CA (US); Tom Sengelaub, Oakland, CA (US); Jie Zhong, Kornwestheim (DE)

(73) Assignee: Apple Inc., Cupertino, CA (US)

( * ) Notice: Subject to any disclaimer, the term of this patent is extended or adjusted under 35 U.S.C. 154(b) by 297 days.

(21) Appl. No.: 18/470,367

(22) Filed: Sep. 19, 2023

(65) Prior Publication Data

US 2024/0104958 A1      Mar. 28, 2024

Related U.S. Application Data

(60) Provisional application No. 63/376,955, filed on Sep. 23, 2022.

(51) Int. Cl.
*G06V 40/18*          (2022.01)
*G06T 7/73*           (2017.01)
          (Continued)

(52) U.S. Cl.
CPC .............. *G06V 40/197* (2022.01); *G06T 7/75* (2017.01); *G06T 17/00* (2013.01);
          (Continued)

(58) Field of Classification Search
CPC ...... G06V 40/197; G06V 40/50; G06V 40/18; G06V 40/19; G06V 40/193; G06T 7/75;
          (Continued)

(56) References Cited

U.S. PATENT DOCUMENTS

| | | | |
|---|---|---|---|
| 11,748,906 B2 * | 9/2023 | Lu ......................... H04N 23/698 | 345/419 |
| 2013/0107207 A1 * | 5/2013 | Zhao ...................... G06V 40/19 | 351/246 |

(Continued)

FOREIGN PATENT DOCUMENTS

JP          2023053631          4/2023

OTHER PUBLICATIONS

An Eye for an Eye: A Single Camera Gaze-Replacement Method. Wolf et al. (Year: 2010).*

(Continued)

*Primary Examiner* — Delomia L Gilliard
(74) *Attorney, Agent, or Firm* — Robert C. Kowert; Kowert, Hood, Munyon, Rankin & Goetzel, P.C.

(57)          ABSTRACT

Methods and apparatus for providing eye model matching in a device are disclosed. When a user activates a device and the presence of the user's eye is detected, an image of the user's eye is captured. An eye model matching process is then implemented to determine a stored eye model (e.g., an eye model stored after enrollment of the eye on the device) that best matches the eye in the captured image. Determination of the best matching eye model may be based on matching between properties of the user's eye in the captured image (such as cornea and pupil features) and properties of the user's eye determined by the eye model. The best matching eye model may then be implemented in, for example, an eye gaze tracking process. In certain instances, the best matching eye model satisfies a threshold for matching before being implemented in the downstream process.

20 Claims, 10 Drawing Sheets

(51) Int. Cl.
   *G06T 17/00*          (2006.01)
   *G06V 40/50*          (2022.01)

(52) U.S. Cl.
   CPC ............... *G06T 2207/10012* (2013.01); *G06T 2207/10048* (2013.01); *G06V 40/50* (2022.01)

(58) Field of Classification Search
   CPC ........... G06T 17/00; G06T 2207/10012; G06T 2207/10048; G06F 3/013
   See application file for complete search history.

(56)                   References Cited

U.S. PATENT DOCUMENTS

| | | | | |
|---|---|---|---|---|
| 2016/0029883 | A1* | 2/2016 | Cox ........................ | G06V 40/19 |
| | | | | 351/209 |
| 2016/0309081 | A1 | 10/2016 | Frahm et al. | |
| 2016/0378183 | A1 | 12/2016 | Teshome et al. | |
| 2017/0123526 | A1 | 5/2017 | Trail et al. | |
| 2018/0101227 | A1* | 4/2018 | Frueh ...................... | G06T 15/40 |
| 2018/0101989 | A1* | 4/2018 | Frueh ...................... | G06T 19/20 |
| 2018/0120932 | A1* | 5/2018 | Sengelaub ............. | A61B 3/113 |
| 2019/0056781 | A1* | 2/2019 | Liu ......................... | G06F 3/013 |
| 2019/0101978 | A1* | 4/2019 | Iseringhausen ...... | G02B 27/017 |
| 2019/0133440 | A1* | 5/2019 | Liu ........................ | A61B 3/032 |
| 2019/0272028 | A1* | 9/2019 | Hong ..................... | G06F 1/163 |
| 2019/0339770 | A1 | 11/2019 | Kurlethimar et al. | |
| 2020/0057487 | A1 | 2/2020 | Sicconi et al. | |
| 2020/0104590 | A1* | 4/2020 | Osuga ..................... | G06T 7/251 |
| 2020/0134868 | A1* | 4/2020 | Liu ......................... | G06V 40/18 |
| 2020/0183490 | A1* | 6/2020 | Klingström ............ | A61B 3/113 |
| 2020/0257359 | A1* | 8/2020 | Klingström .............. | G06T 7/62 |
| 2021/0034149 | A1* | 2/2021 | Lin ......................... | G06T 7/292 |
| 2023/0105302 | A1 | 4/2023 | Torneus | |
| 2024/0094808 | A1* | 3/2024 | Fu ........................... | G06F 3/013 |

OTHER PUBLICATIONS

Subarna Tripathi et al., "A Statistical Approach to Continuous Self-Calibrating Eye Gaze Tracking for Head-Mounted Virtual Reality Systems", dated Dec. 20, 2016, pp. 1-9.

Soumil Chugh, "An Eye Tracking System for a Virtual Realty Headset", dated 2020, pp. 1-86.

International Search Report and Written Opinion from PCT Application No. PCT/US2023/033534, mailed Dec. 21, 2023, pp. 1-11.

* cited by examiner

USER EYE MODEL MATCH DETECTION

PRIORITY CLAIM

The present application claims priority to U.S. Provisional App. No. 63/376,955, entitled "User Eye Model Match Detection," filed Sep. 23, 2022, the disclosure of which is incorporated by reference herein in its entirety.

BACKGROUND

Technical Field

Embodiments described herein relate to eye modelling systems. More particularly, embodiments described herein relate to systems and methods for matching eye models based on captured images of a user's eye.

Description of the Current Art

Virtual reality (VR) allows users to experience and/or interact with an immersive artificial environment, such that the user feels as if they were physically in that environment. For example, virtual reality systems may display stereoscopic scenes to users in order to create an illusion of depth, and a computer may adjust the scene content in real-time to provide the illusion of the user moving within the scene. When the user views images through a virtual reality system, the user may thus feel as if they are moving within the scenes from a first-person point of view. Similarly, mixed reality (MR) combines computer generated information (referred to as virtual content) with real world images or a real world view to augment, or add content to, a user's view of the world. The simulated environments of VR and/or the mixed environments of MR may thus be utilized to provide an interactive user experience for multiple applications, such as applications that add virtual content to a real-time view of the viewer's environment, interacting with virtual training environments, gaming, remotely controlling drones or other mechanical systems, viewing digital media content, interacting with the Internet, or the like.

An eye or gaze tracker is a device for estimating eye positions and eye movement. Eye or gaze tracking processes and systems have been used in research on the visual system, in psychology, psycholinguistics, marketing, and as input devices for human-computer interaction. In the latter application, typically the intersection of a person's point of gaze with a desktop monitor is considered. An eye model is a mathematical representation of a human eye that may be used in processes and systems including but not limited to gaze tracking processes and systems.

Figure 1:
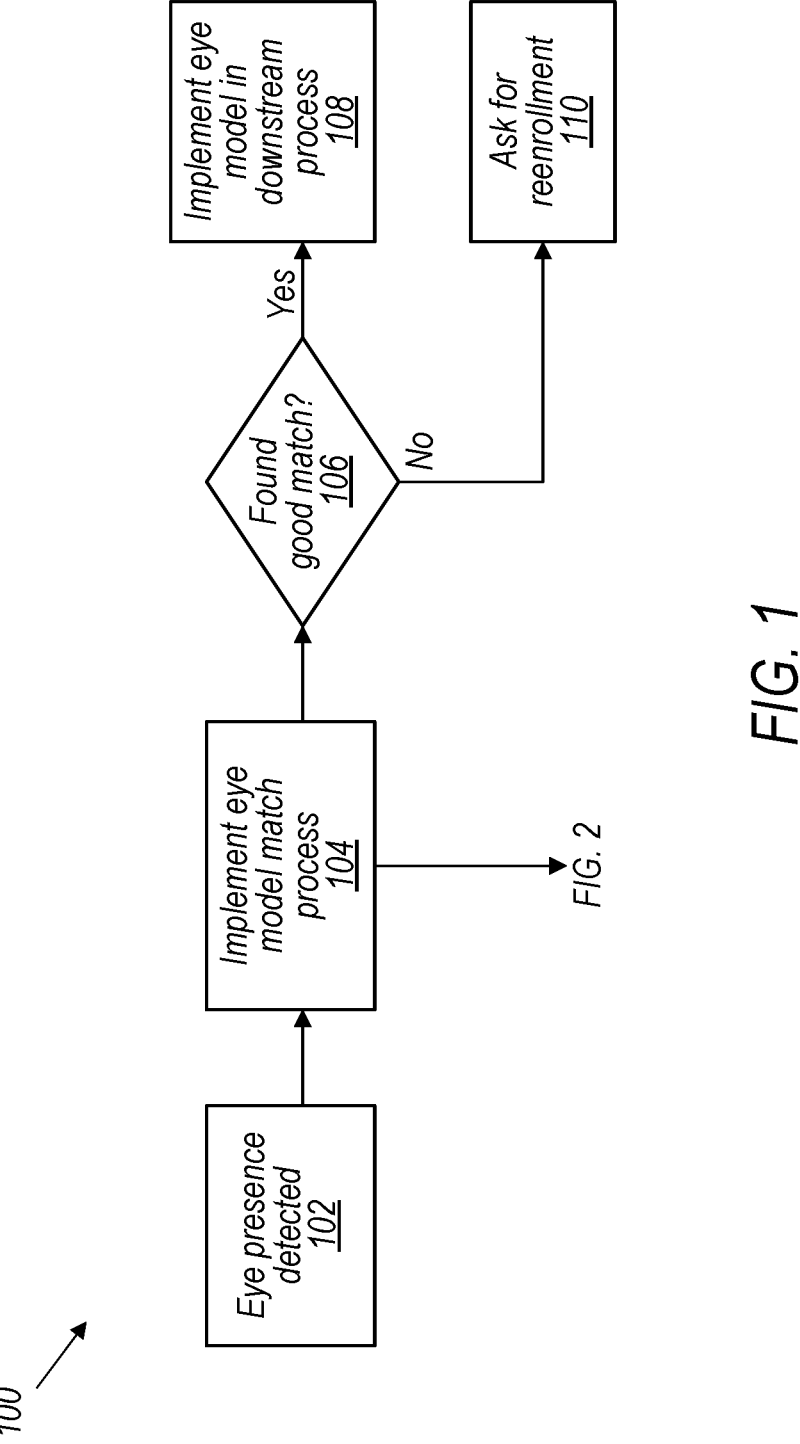
FIG. 1 is a flowchart of a workflow implementing an eye model matching process in a device, according to some embodiments.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

"Comprising." This term is open-ended. As used in the claims, this term does not foreclose additional structure or steps. Consider a claim that recites: "An apparatus comprising one or more processor units . . . ." Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112, paragraph (f), for that unit/circuit/component. Additionally, "configured to" can include generic structure (e.g., generic circuitry) that is manipulated by software or firmware (e.g., an FPGA or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, a buffer circuit may be described herein as performing write operations for "first" and "second" values. The terms "first" and "second" do not necessarily imply that the first value must be written before the second value.

"Based On" or "Dependent On." As used herein, these terms are used to describe one or more factors that affect a determination. These terms do not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

"Or." When used in the claims, the term "or" is used as an inclusive or and not as an exclusive or. For example, the phrase "at least one of x, y, or z" means any one of x, y, and z, as well as any combination thereof.

DETAILED DESCRIPTION

Various embodiments of methods and apparatus for matching a user's eye to an eye model stored in the apparatus are described. In certain embodiments, eye models are generated during user eye enrollment on a device such as a head-mounted device (HMD). An imaging system, as described herein, may include two or more illumination sources (e.g., point light sources such as light-emitting diodes (LEDs)) that illuminate a person's eye or eye region, and at least one camera configured to capture images of light from the illumination sources reflected by the eye when illuminated. During an enrollment process, images of the eye captured when the eye is in two or more different orientations and with two or more different levels of display brightness may be processed by a controller to generate an eye model. The eye model may include, for example a model of the eye's cornea and pupil features. In some embodiments, the enrollment process may be performed as an initial process when the device is used by the user (e.g., when the user places the HMD on their head). Alternatively, the enrollment process may be a continuous or iterative process that constructs and improves the eye model as the user is using the device.

Embodiments of methods and apparatus for user eye enrollment and user eye model matching as described herein may, for example, be used in head-mounted devices (HMD), for example HMDs of computer-generated reality (XR) systems such as a mixed or augmented reality (MR) systems or virtual reality (VR) systems. In conventional systems, a generic human eye model is typically used as a base. In various disclosed embodiments, however, an eye model specific to a user (which may be referred to as a user-aware eye model) is constructed from images of the user's eyes captured during the enrollment process and used instead of a generic human eye model. Accordingly, subsequent to enrollment, eye model matching may be implemented when a user activates the device (e.g., when a user's eye is positioned and detected in the device such as when the HMD is placed on the user's head).

In various embodiments, eye model matching may be implemented for a single user that uses the device in different situations (e.g., with glasses or without, with different glasses, with or without contact lenses, with or without clip-on lenses, etc.). In some embodiments, a user may enroll themselves for each of the different situations and eye model matching may be implemented to automatically select the eye model best suited for a particular situation when the user activates the device. In some instances, the user may attempt to operate the device in a new, unenrolled situation. In such instances, eye model matching may determine whether an enrolled eye model is satisfactory for use of the device or whether the user needs to enroll for the new situation. Additional embodiments may be contemplated where eye model matching is used to differentiate between different users of a single device when there are detectable differences between the various users' eye models.

In certain embodiments, eye model matching is implemented using images of a user's eye captured in similar conditions to those implemented during eye enrollment. For instance, a user may put on a device (e.g., an HMD) and a stimulus or guide may be displayed on the display to cause the user to look in different directions. Brightness of the display, or other display characteristics, may be modulated to stimulate different pupil responses. Images of the user's eye may be captured at two or more different orientations (e.g., poses) and at two or more levels of brightness by one or more eye cameras. From these images, the system determines features of the user's eye. Examples of features of the user's eye that may be determined include, but are not limited to, cornea contour features and pupil features. User eye model matching may be performed for one eye, or for both eyes.

In various instances, eye model matching is implemented in combination gaze tracking. A gaze tracking system may, for example, be used to compute gaze direction and a visual axis using glints and eye features based on the three-dimensional (3D) geometric model of the eye. Eye model matching may be implemented before gaze tracking to select an eye model to be used in the gaze tracking process. In certain instances, eye model matching selects the best matched eye model to a user's eye for the gaze tracking process when the device is activated by the user. Accordingly, implementing eye model matching to select the eye model for gaze tracking when the user activates the device may ensure the quality and accuracy of the gaze tracking process is maintained between uses of the device. Additionally, implementing eye model matching reduces the need to have the user enroll his/her eyes before every use. Thus, the user may have a more satisfactory experience using the device. The disclosed embodiments of the eye model matching process may be used in any additional application or system in which models of a user's eyes are used beyond those described herein.

FIG. 1 is a flowchart of a workflow implementing an eye model matching process in a device, according to some embodiments. Workflow 100 may be implemented for any of the various embodiments of devices that capture images of user's eyes (e.g., HMDs) described herein though it should be understood that eye model matching process 100 is not limited to the disclosed embodiments. In 102, the presence of a user's eye is detected in a device having at least one camera directed towards the user's eye (such as device 3000, HMD device 4000, or HMD device 500, described herein). For example, the presence of the user's eye may be detected when the user activates the device and subsequently the camera captures at least one image of the user's eye.

In response to the eye presence being detected in 102, an eye model matching process is implemented in 104. One embodiment of the implemented eye model matching process is process 200, shown in FIG. 2 and described below. In various embodiments, the eye model matching process is implemented without the user noticing that the process is implemented. For instance, the eye model matching process may be implemented during initial startup of the device when the user activates the device and the user's eye presence is detected.

The eye model matching process implemented in 104 may determine whether a good match for the eye of the user is found and, in 106, a decision may be made based on the match determination. If a good match is found in 106, then the eye model determined by the eye model matching process in 104 may be implemented in downstream processes on the device in 108. For instance, the matching eye model may be implemented in a gaze tracking process, as described herein, or any other process that implements eye models. When there is not good match found in 106, then the device may ask, or otherwise trigger, the user to reenroll the user's eye in 110 (e.g., using an enrollment process, as described herein). In some embodiments, as described below, a good match is determined based on assessment of the eye model versus a threshold.

Figure 2:
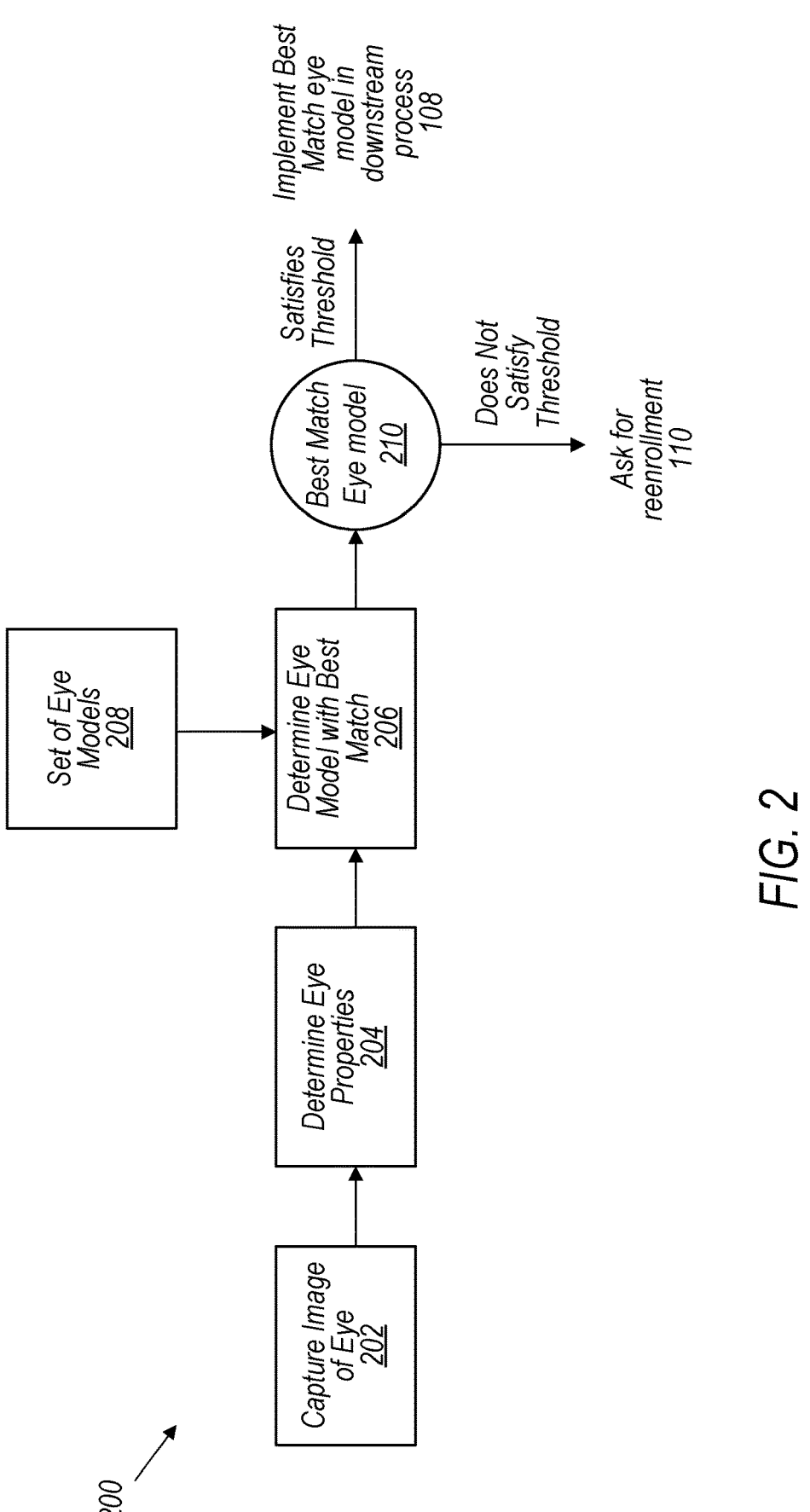
FIG. 2 is a flowchart of an eye model matching process in a device, according to some embodiments.

FIG. 2 is a flowchart of an eye model matching process in a device, according to some embodiments. In certain embodiments, eye model matching process 200 is implemented in response to the detection of the presence of a user's eye in a device (e.g., as shown in step 104 of FIG. 1). Additional embodiments may be contemplated where process 200 is implemented in response to other actions. For instance, process 200 may be implemented in response to a user prompt on the device or when a downstream process (e.g., a gaze tracking process) is not operating correctly.

In various embodiments, process 200 begins with capturing an image of the user's eye in 202. The image may be captured by a camera positioned to capture images of the eye of the user when the user wears or operates the device, as described herein. In some embodiments, multiple images of the user's eye may be captured. For instance, multiple images may be captured, and the image data from the images is combined to increase the signal-to-noise ratio. In some embodiments, the multiple images are acquired by multiple cameras. For instance, two cameras may capture images of a user's eye at the substantially the same time. As two cameras are used, the images may have different perspectives (e.g., angles) of the eye and thus, a combined image may provide a stereoscopic view of the eye and provide for 3-dimensional assessment of the eye.

After the image is captured in 202, data in the captured image may be analyzed to determine eye properties for the captured image in 204. For example, the captured image may be analyzed by a controller or other processor on the device to detect properties of the user's eye in the captured image. In certain embodiments, the eye properties determined from the captured image include features of the eyes in the captured image. The eye features may include, for example, cornea features (such as cornea contour) and/or pupil features. Eye properties may also include, but not be limited to, other properties such as position of the eye, movement of the eye (as detected between multiple images), or pupil dilation. In various embodiments, eye properties determined from the captured image are features found in a 3-dimensional (3D) space of the user's eye.

In 206, the eye properties determined from the captured image are compared to eye properties determined from eye models in a set of eye models 208 to determine the eye model providing the best match to the captured image. In certain embodiments, the set of eye models 208 includes eye models determined by user eye model enrollment methods described herein. For instance, the set of eye models 208 may include multiple eye models generated during enrollment of the user's eye on the device.

In 206, eye properties, such as cornea and pupil features, from the captured image are compared to eye properties determined from a specific eye model to determine differences between the eye properties in the captured image and the eye properties determined from the eye model. The comparison can be made for each individual eye model in the set of eye models 208 or a select number of individual eye models from the set. In certain embodiment, the eye model that provides the best match is the eye model that provides the smallest difference in eye properties from the captured image.

Figure 3:
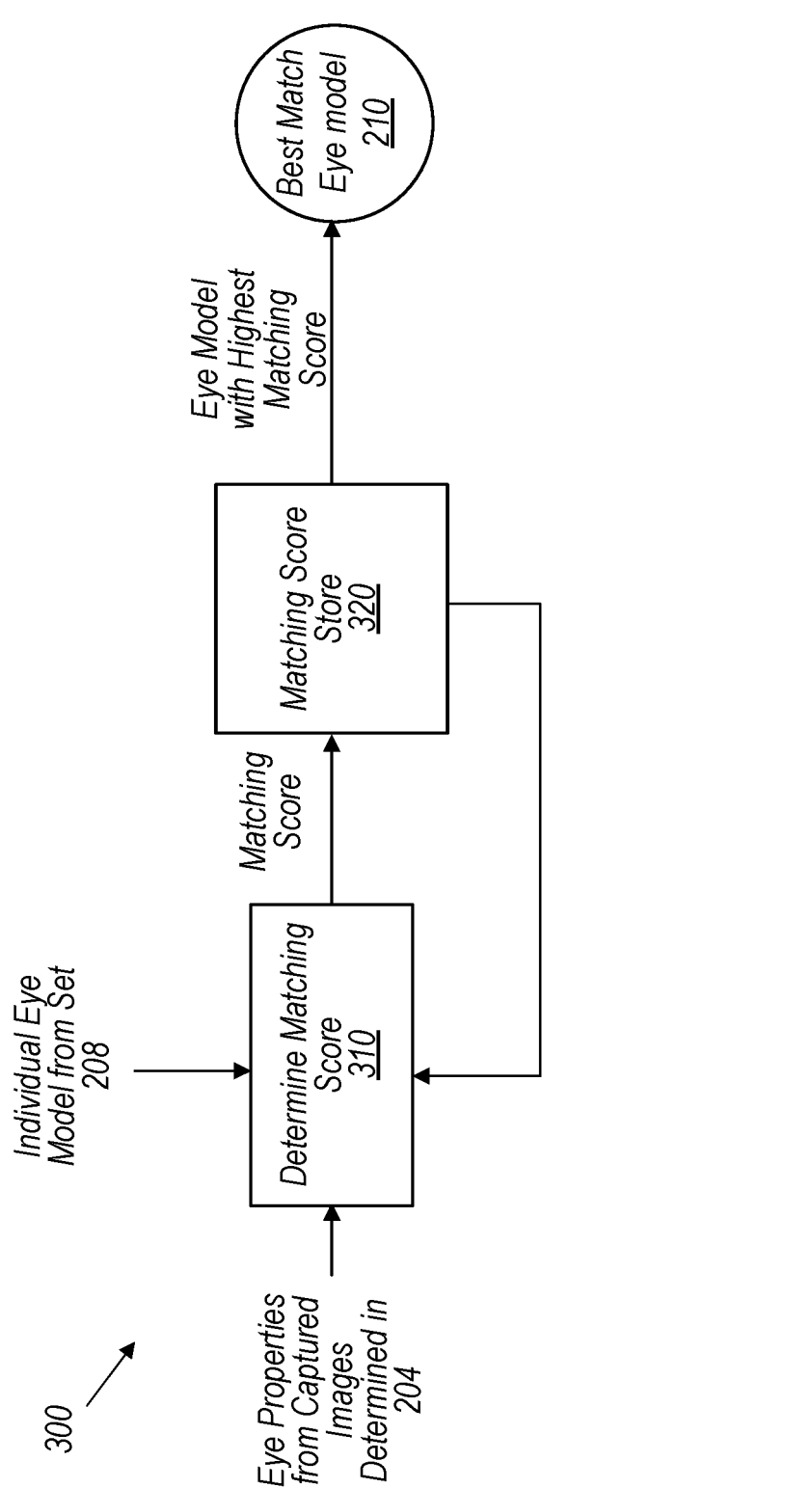
FIG. 3 is a flowchart of a process for determining the best match eye model, according to some embodiments.

FIG. 3 is a flowchart of a process for determining the best match eye model, according to some embodiments. In certain embodiments, process 300 is implemented in 206 of process 200, shown in FIG. 2. In 310, eye properties for an individual eye model are compared to the eye properties in the captured image to determine a matching score for the individual eye model. The matching score may then be provided to matching score store 320 (which may be in a memory of the device). The determination of a matching score is repeated for each of the individual eye models in set 208 until a matching score for every eye model is stored in matching score store 320.

In some embodiments, the matching score for an eye model is determined based on a residual error determined for the eye model. Residual error is a measure of the differences between the eye properties determined from the eye model and the eye properties in the captured image. For instance, residual error may be a measure of the difference between where the eye model predicts an eye feature to be versus where the eye feature actually is in the captured image. In some embodiments, the residual error is a total amount of error for each of the eye properties assessed in the comparison (e.g., a total error for cornea and pupil features). The larger the residual error, the greater the differences between the eye model and the captured image. Residual error is also a measure of the confidence that the eye model matches the captured image with smaller residual error providing higher confidence. Thus, the smaller the residual error, the higher the matching score is as the confidence that there is a match is higher.

Figure 4:
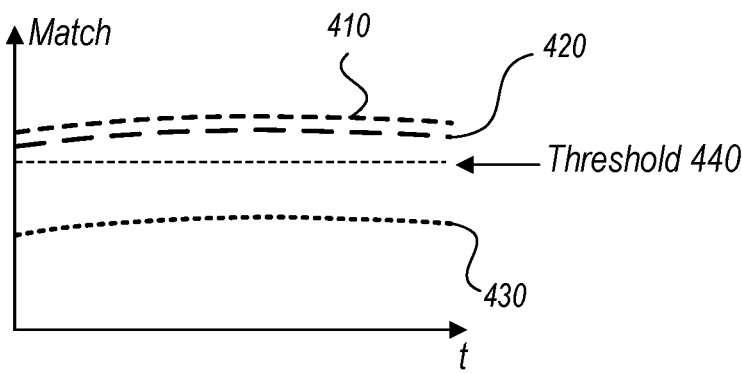
FIG. 4 depicts an example plot of matching scores (y-axis) versus time (x-axis) for various eye models.

In certain embodiments, the best matching eye model 210 is the eye model with the highest matching score in matching score store 320 after all individual eye models have been evaluated. Correspondingly, the best matching eye model 210 determined in process 300 is the eye model that has the smallest amount of residual error between the eye properties determined by the eye model and the eye properties in the captured image. FIG. 4 depicts an example plot of matching scores (y-axis) versus time (x-axis) for various eye models. The example includes first eye model 410, second eye model 420, and third eye model 430. In FIG. 4, the lower the residual error, the higher the matching score (e.g., the higher the confidence in the eye model matching the eye in the captured image). As shown, first eye model 410 provides the highest matching score, second eye model 420 provides the second highest matching score, and third eye model 430 has the lowest matching score. Thus, first eye model 410 may then be determined to be the best matching eye model 210, as shown in FIGS. 2 and 3.

Turning back to FIG. 2, in some embodiments, the best match eye model 210 determined in 206 is compared against a threshold to determine whether the best match eye model 210 is a good match. For example, as discussed above, the residual error is a measure of confidence in the eye model matching the captured image. Accordingly, the threshold may be set to a specified error level that corresponds to a specified confidence that the eye model matches the captured image. Alternatively, the threshold may be set to a specified matching score that corresponds to the specified confidence. An example of a threshold that may be implemented is shown in FIG. 4 (threshold 440). The specified confidence that determines the threshold may, for instance, provide a suitable user satisfaction in performance of the device (e.g., a suitable performance in eye gaze tracking on the device). The threshold may be determined from statistical studies or other analysis of the operation of the device.

As shown in FIG. 2, when the best match eye model 210 satisfies the threshold, the best match eye model may then be implemented in a downstream process (e.g., an eye gaze tracking process) in 108 (shown in FIG. 1). Conversely, when the best match eye model 210 does not satisfy the threshold, the user may be asked to reenroll the eye in 110

(shown in FIG. 1). As described above, the best match eye model 210 provides the least amount of residual error between the eye model and the captured image. Thus, when the best match eye model 210 does not satisfy the threshold, none of the eye models in the set of eye models 208 satisfy the threshold. As further example, turning again to FIG. 4, first eye model 410 satisfies threshold 440 (e.g., the matching score of the first eye model is above the threshold). It should be noted that in the example of FIG. 4, third eye model 430 is the only eye model that does not satisfy threshold 440. Thus, if third eye model 430 was the only eye model or was the "best" match eye model, then the best eye match model would not satisfy the threshold.

As may be recognized, the above-described embodiments of FIGS. 1-4 are implemented with respect to a captured image to provide eye model matching for one eye of the user. As described herein, enrollment and generation of eye models is typically implemented independently (e.g., the left eye and right eye are independently enrolled with different eye models for each eye). Accordingly, in various embodiments, the eye model matching described herein is implemented independently for each eye of a user. For instance, capturing an image of the left eye and matching an eye model for the left eye to the captured image for the left eye is independent from capturing an image of the right eye and matching an eye model for the right eye to the captured image for the right eye. The eye matching processes for the left and right eyes may be implemented substantially simultaneously (e.g., when the user activates the device and the presences of the eyes are detected by the device).

Example Device

A non-limiting example application of the methods and apparatus for enrollment are in devices that include an imaging system with at least one eye camera (e.g., infrared (IR) cameras) positioned at each side of a user's face, and an illumination source (e.g., point light sources such as an array or ring of IR light-emitting diodes (LEDs)) that emit light towards the user's eyes. The imaging system may, for example, be a component of a head-mounted device (HMD), for example, an HMD of a computer-generated reality (XR) system such as a mixed or augmented reality (MR) system or virtual reality (VR) system. The HMD may, for example be implemented as a pair of glasses, goggles, or helmet. Other example applications for the imaging system include mobile devices such as smartphones, pad or tablet devices, desktop computers, and notebook computers, as well as stand-alone systems mounted on walls or otherwise located in rooms or on buildings. In any of these example systems, the imaging system may be used for gaze tracking, biometric authentication, both, or for other applications.

Figure 5A:
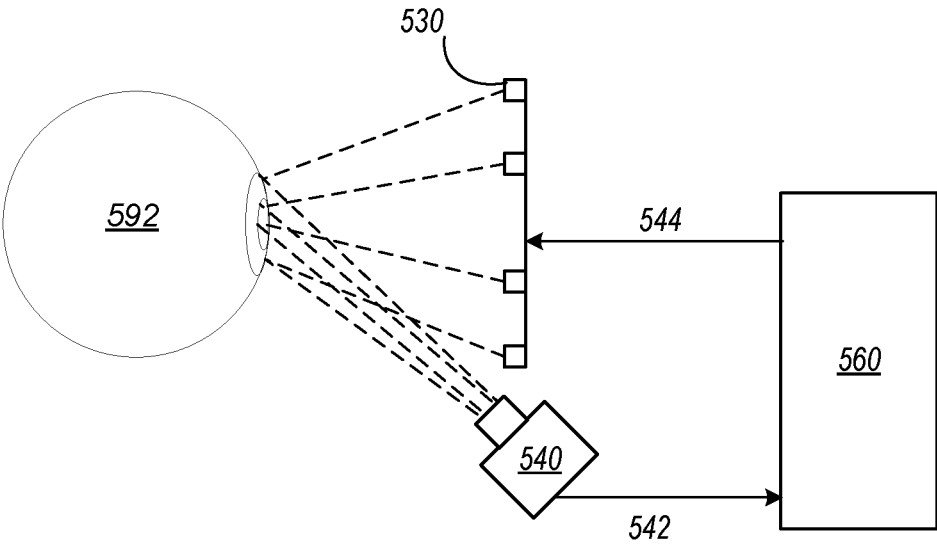
FIGS. 5A through 5F illustrate example eye camera systems, according to some embodiments.
Figure 5B:
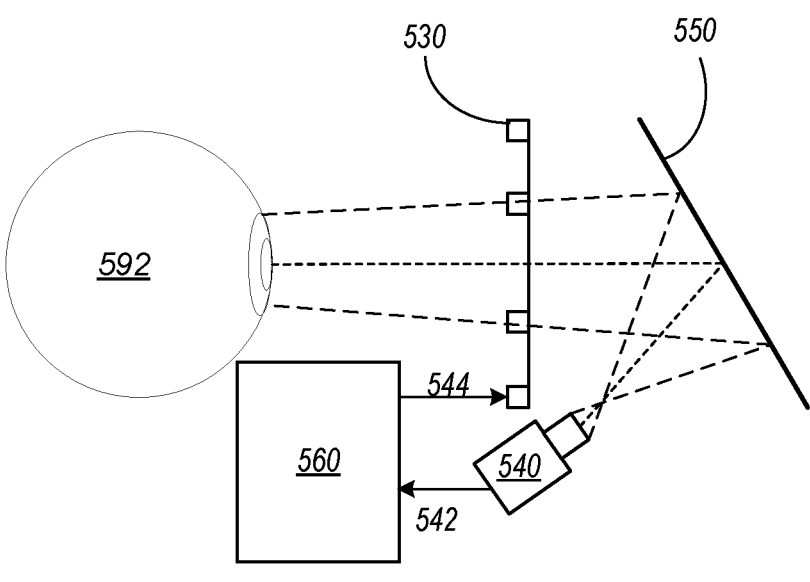
Figure 5C:
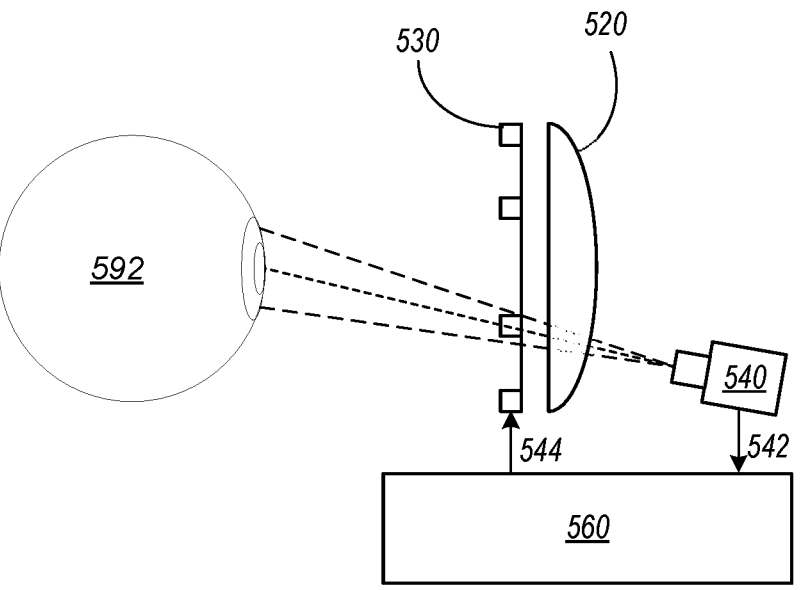

FIGS. 5A through 5F illustrate example imaging systems, according to some embodiments. An imaging system may include, but is not limited to, one or more cameras 540, an illumination source 530, and a controller 560. FIG. 5A shows an imaging system in in which the eye camera 540 images the eye 592 directly. However, in some embodiments the eye camera 540 may instead image a reflection of the eye 592 off of a hot mirror 550 as shown in FIG. 5B. In addition, in some embodiments, the eye camera 540 may image the eye through a lens 520 of an imaging system, for example as shown in FIG. 5C.

Figure 5D:
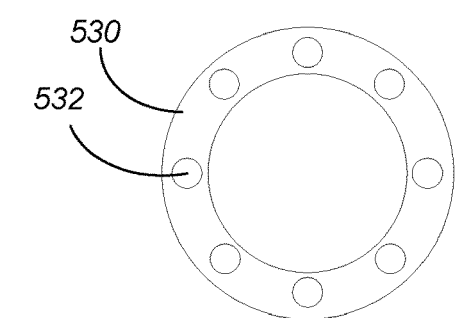

In some embodiments, a device (e.g., a head-mounted device (HMD)) may include an imaging system that includes at least one eye camera 540 (e.g., visible light and/or infrared (IR) cameras) positioned on one side or at each side of the user's face, and an illumination source 530 (e.g., point light sources such as an array or ring of IR light-emitting diodes (LEDs)) that emits light towards the user's eye(s) 592 or periorbital region. FIG. 5D shows an example illumination source 530 that includes multiple LEDs 532. In this example, there are eight LEDs 532 arranged in a ring. Note, however, that the number and arrangement of the LEDS 532 in an illumination source 530 may be different. In addition, in some embodiments other light-emitting elements than LEDs may be used. In some embodiments, the LEDs 532 may be configured to emit light in the IR or NIR range, for example at 740, 750, 840, 850, 940, or 950 nanometers.

Figure 5E:
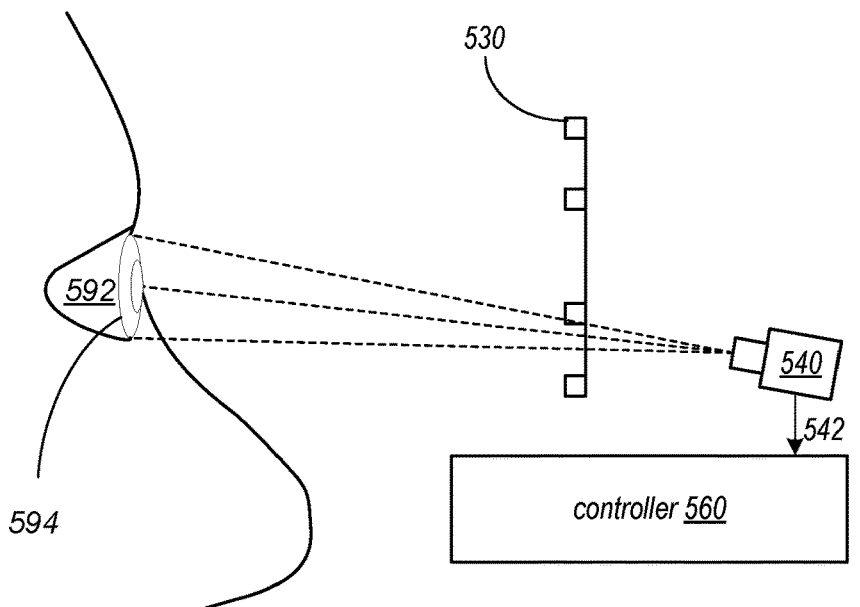
Figure 5F:
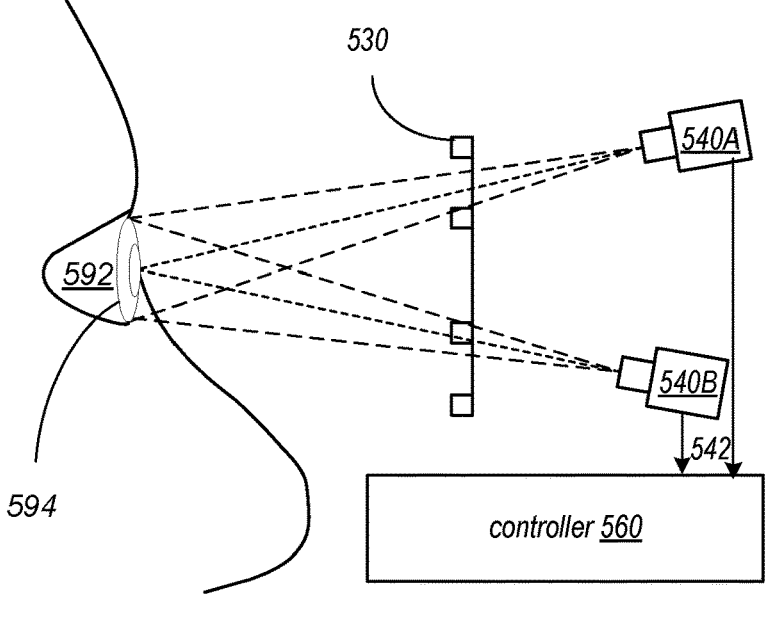

In embodiments, an eye camera 540 may be pointed towards the eye 592 to receive light from the illumination source 530 reflected from the eye 592, as shown in FIG. 5A. However, in some embodiments the eye camera 540 may instead image a reflection of the eye 592 off of a hot mirror 550 as shown in FIG. 5B. In addition, in some embodiments, the eye camera 540 may image the eye 592 through a lens 520 or other optical element of the device, for example as shown in FIG. 5C. Some embodiments may include a single camera 540 that captures images of a user's eye 592, as illustrated in FIG. 5E. Some embodiments may include two or more cameras 540 that capture images of a user's eye 592, as illustrated in FIG. 5F.

The device that includes an imaging system as illustrated in FIGS. 5A through 5F may include a controller 560 comprising one or more processors and memory. Controller 560 may include one or more of various types of processors, image signal processors (ISPs), graphics processing units (GPUs), coder/decoders (codecs), and/or other components for processing and rendering video and/or images. In some embodiments, the controller 560 may be integrated in the device. In some embodiments, at least some of the functionality of the controller 560 may be implemented by an external device coupled to the device by a wired or wireless connection. While not shown in FIGS. 5A through 5F, in some embodiments, controller 560 may be coupled to an external memory for storing and reading data and/or software.

The controller 560 may send control signals to the illumination source 530 and camera(s) 540 to control the illumination of the eye 592 and to capture images of the eye 592. The controller 560 may use the images 542 of the eyes 592 captured by the eye camera(s) 540 during an enrollment process to construct or adjust a 3D model of the eye 592. The eye model may then be used for one or more purposes. For example, the controller 560 may implement gaze tracking algorithms that estimate the user's gaze direction based on additional images 542 captured by the camera(s) and the eye model generated during the enrollment process. A gaze tracking algorithm may, for example, process images 542 captured by the cameras 540 to identify glints (reflections of the LEDs 530) obtained from the eye cameras 540, pupil position and diameter, or other features of the eyes, and apply this information to the eye model to determine and track the direction in which the user is currently looking (the gaze direction).

Example Enrollment Processes

Figure 6:
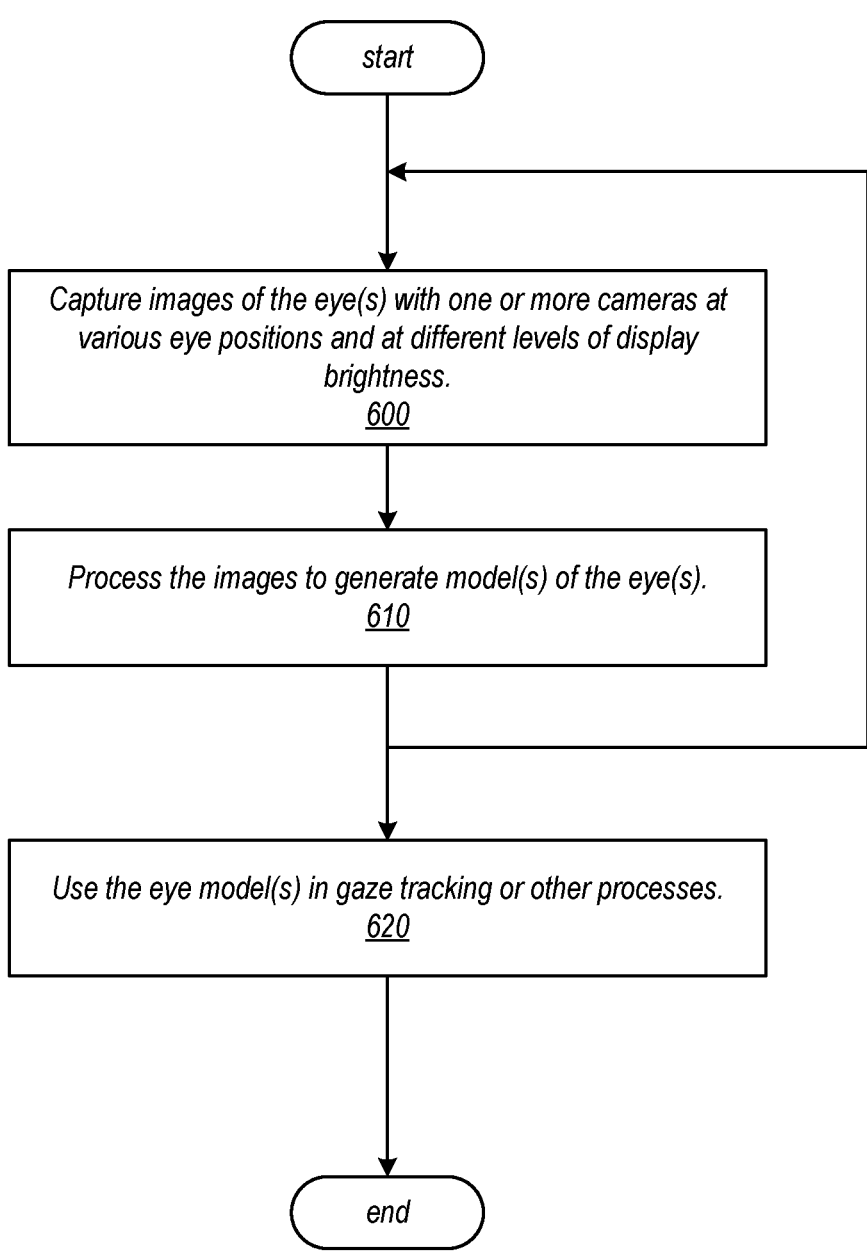
FIG. 6 is a high-level flowchart of an enrollment method, according to some embodiments.

Embodiments of user eye model enrollment methods, and systems that implement the enrollment methods, are described. FIG. 6 is a high-level flowchart of an enrollment method, according to some embodiments. In embodiments, during an enrollment process, images of a user's eye are captured by one or more cameras when the eye is in two or more different orientations and at two or more different levels of display brightness, as indicated at 600. As indicated at 610, the captured images are processed by a controller to generate a 3-dimensional, user-aware eye model, for example a model of at least the eye's cornea and pupil features. As indicated at 620, the generated user-aware eye model may be used in other processes, for example in a gaze tracking process. Embodiments may be used to generate an eye model for one eye, or for both eyes. As indicated by the arrow returning from 610 to 600, in some embodiments the enrollment process may be an iterative process or a continuous process performed while the user is using the system (e.g., an HMD). Note that the generated eye model(s) may be stored and used in the future, for example when the particular user puts on or uses the device again. Further, separate, user-aware eye models may be generated for two or more different users of a device.

Embodiments of the enrollment process may perform a physiologically accurate reconstruction of the cornea surface, and may also perform dynamic pupil modeling, when constructing a user-aware eye model. The pupil, as it contracts and dilates, moves in multiple degrees of freedom. Dynamic pupil modeling captures and processes the user's pupil across those degrees of freedom. The enrollment process modulates brightness to stimulate changes in pupil diameter. Thus, a mathematical representation of the cornea surface and a dynamic model of the pupil are captured in the user-aware eye model generated by the enrollment process. By reconstructing an accurate representation of the cornea surface as well as dynamic pupil behavior of a particular user to generate a user-aware eye model, the enrollment process may increase accuracy in processes such as gaze tracking that use the eye model when compared to conventional systems that use a generic "one size fits all" eye model.

Embodiments of the enrollment process may prompt the user to look in different directions when capturing images of the eye. From each captured image, a set of features, e.g. lens and pupil contour, may be derived. Prompting the user to look in different directions may provide good coverage of the contour of the eye. The pupil can move in many degrees of freedom, and thus display brightness is changed so that the process can observe those states and regress to generate a pupil model.

User-aware eye models may be generated during an enrollment process for a device such as a head-mounted device (HMD). In some embodiments, the enrollment process may be performed as an initial process when the device is used by the user, for example when the user places the HMD on their head. Alternatively, the enrollment process may be a continuous or iterative process that constructs and improves the eye model as the user is using the device.

Embodiments of eye model enrollment methods that use two different approaches to generate the user eye model are described. In a first method, an initial eye model, which may be a generic one, is input. The user is prompted to look at target locations (corresponding to poses) at which images of the eye are captured, in some embodiments at different levels of display brightness. The method then finds an optimal eyeball center so that the features that are constructed or calculated from a pose matches features collected from the respective image. An updated eye model is constructed. The updated eye model may be tested, and if not satisfactory (e.g., if an error rate is above a threshold) the updated eye model may be input to the beginning of the method for optimization. In a second method, an initial eye model is not used. Instead, multiple iterations of capturing and processing images at different locations (and at different levels of display brightness) are performed. In a first iteration, an eyeball center is estimated from a set of captured eye poses, and an initial user-aware eye model is constructed. The eye model is then tested, for example using the eye model in a gaze tracking process. If the eye model is not satisfactory, for example f the error rate of the process when the eye model is used in the process is above a threshold, another iteration of capturing and processing eye poses to optimize the eye model is performed. These iterations may continue until the error rate is below the threshold.

Embodiments capture images of the user's eye(s). Based on a current version of the eye model, the cornea features and pupil positions are calculated. Those calculated features are then compared to what can actually be derived from captured images of the eye to determine how far off the model is; the model can then be updated based on the comparison.

In embodiments, eye poses may be calculated using a combination of information obtained from images captured by the eye cameras and existing eye models to determine the features being tracked. Eye poses are selected that give the best match of features. The eye model parameters are fixed, and then an eye pose (e.g., with 5 DoF) is estimated.

The eye poses are used to align features to a local system. A goal is to generate a rigid eye model given a local system. Because what is observed in the eye images are features in a world system, those features need to be aligned to the local system. Once an eye pose is obtained, the eye instances from different gaze directions can be aligned. From that, the cornea surface and pupil models can be optimized.

Eye pose refers to the position and orientation of an eye. However, the eye model indicates, at a given pose, what features of the eye, e.g. cornea contour and pupil shape, would be apparent from the perspective of the eye camera at that pose.

The eye camera system may include active illumination (e.g., from LEDs as illustrated in FIGS. 5A-5F), from which reflections on the cornea surface can be observed. Refracted pupil contour can also be observed. Light reflections, observations of the points that the light is reflected on the surface of the eye, varies based on eye pose. The eye pose may thus be derived from the position of reflections or glints produced by the active illumination LEDs, and also from the pupil contour.

Embodiments of methods and apparatus for user eye enrollment as described herein may, for example, be used in HMDs of computer-generated reality (XR) systems such as a mixed or augmented reality (MR) systems or virtual reality (VR) systems. In conventional systems, a generic human eye model is typically used as a base. In embodiments, instead of using a generic human eye model, a user-aware eye model is constructed from images of the user's eyes captured during the enrollment process.

In some embodiments, ground truth targets may be used during the enrollment process to guide the user and construct the eye model. However, embodiments are described in which user-aware eye models may be constructed without using ground truth targets. Removing the dependency on ground truth targets may provide a better user experience, and also provides more freedom for system designers.

A system that implements the user eye model enrollment methods may include, but is not limited to, at least one eye camera (e.g., an infrared (IR) or near-infrared (NIR) camera, an RGB or RGB-D camera, etc.), an illumination source that includes light-emitting elements (e.g., IR or NIR LEDs, or LEDs in other wavelengths), a controller, and a display. Embodiments of the user eye model enrollment methods may, for example, be implemented using any of the systems as illustrated in FIGS. 5A through 5F. FIGS. 7A through 9 illustrate example devices and systems that may implement embodiments of the user eye model enrollment methods.

Example Systems

Figures 7A, 7B:
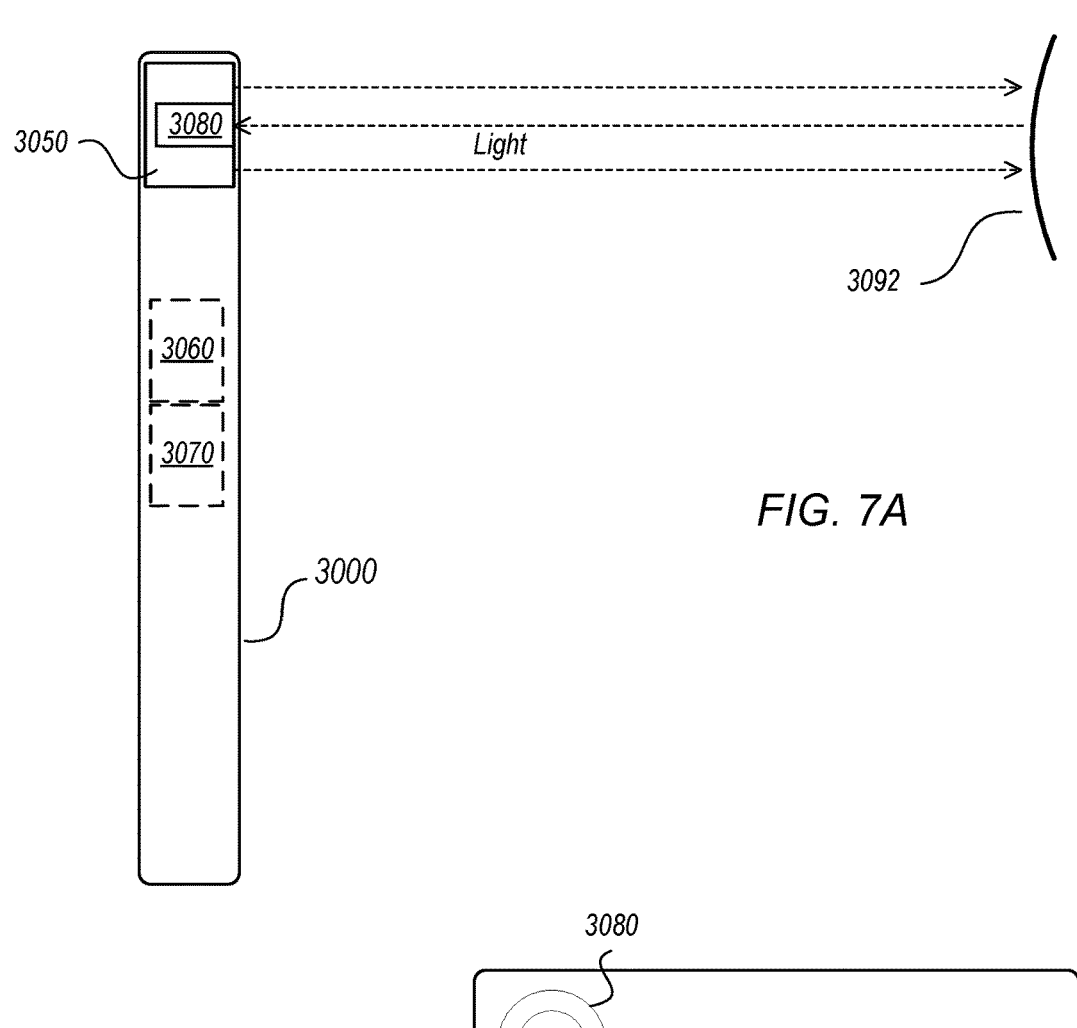
FIGS. 7A and 7B are block diagrams illustrating a device that may include components and implement methods as illustrated in FIGS. 1 through 6, according to some embodiments.

FIGS. 7A and 7B are block diagrams illustrating a device that may include components and implement methods as illustrated in FIGS. 1 through 6, according to some embodiments. An example application of the methods for user eye model enrollment as described herein is in a handheld device 3000 such as smartphone, pad, or tablet. FIG. 7A shows a side view of an example device 3000, and FIG. 7B shows an example top view of the example device 3000. Device 3000 may include, but is not limited to, a display screen (not shown), a controller 3060 comprising one or more processors, memory 3070, pose, motion, and orientation sensors (not shown), and one or more cameras or sensing devices such as visible light cameras and depth sensors (not shown). A camera 3080 and illumination source 3040 may be attached to or integrated in the device 3000, and the device 3000 may be held and positioned by the user so that the camera 3080 can capture image(s) of the user's eye while illuminated by the illumination source 3050. The captured images may, for example, be processed by controller 3060 to generate a user eye model. The user eye model may then be used in another process such as gaze tracking or biometric authentication.

Note that device 3000 as illustrated in FIGS. 7A and 7B is given by way of example, and is not intended to be limiting. In various embodiments, the shape, size, and other features of a device 3000 may differ, and the locations, numbers, types, and other features of the components of a device 3000 may vary.

Figure 8:
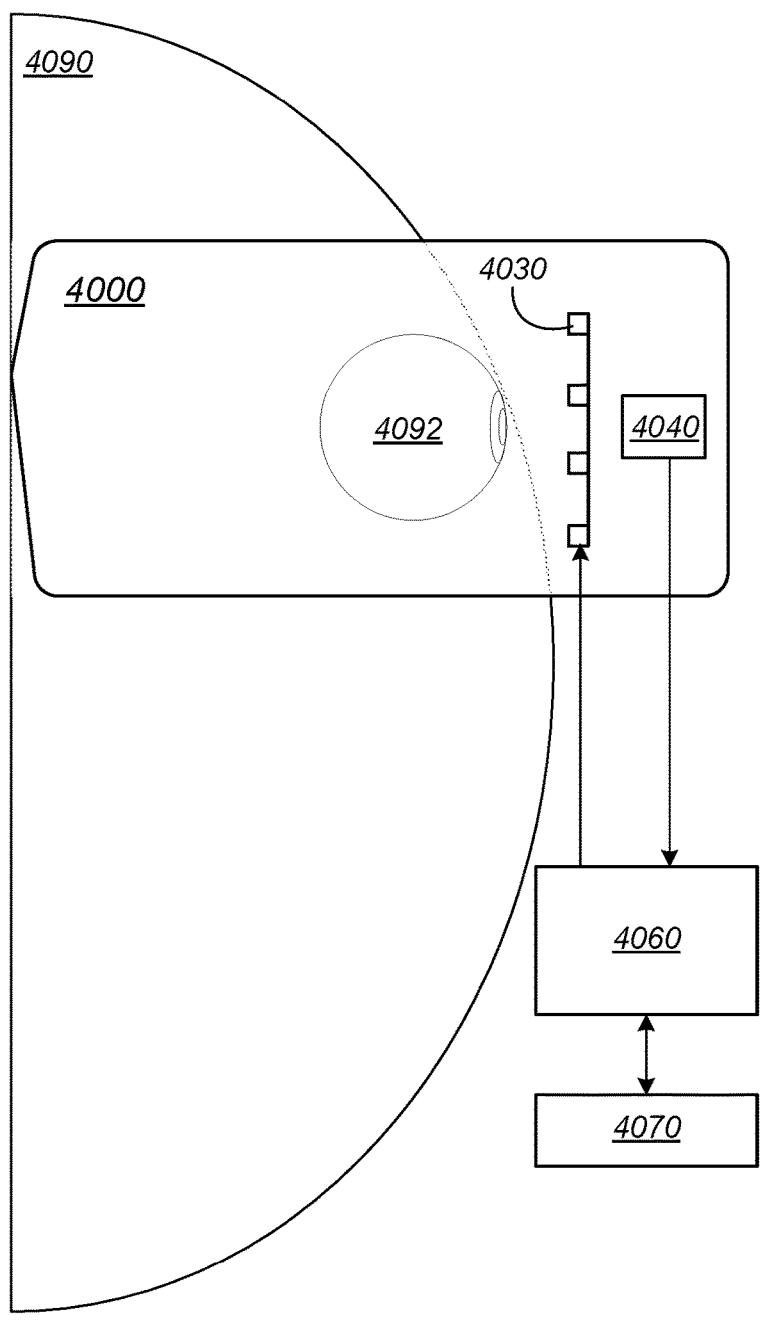
FIG. 8 illustrates an example head-mounted device (HMD) that may include components and implement methods as illustrated in FIGS. 1 through 6, according to some embodiments.

FIG. 8 illustrates an example head-mounted device (HMD) that may include components and implement methods as illustrated in FIGS. 1 through 6, according to some embodiments. The HMD 4000 may, for example be a component in a mixed or augmented reality (MR) system. Note that HMD 4000 as illustrated in FIG. 8 is given by way of example, and is not intended to be limiting. In various embodiments, the shape, size, and other features of an HMD 4000 may differ, and the locations, numbers, types, and other features of the components of an HMD 4000 may vary. In some embodiments, HMD 4000 may include, but is not limited to, a display and two optical lenses (eyepieces) (not shown), mounted in a wearable housing or frame. As shown in FIG. 8, HMD 4000 may be positioned on the user's head 4090 such that the display is disposed in front of the user's eyes 4092. The user looks through the eyepieces onto the display. HMD 4000 may also include sensors that collect information about the user's environment (video, depth information, lighting information, etc.) and about the user (e.g., eye tracking sensors). The sensors may include, but are not limited to one or more eye cameras 4040 (e.g., infrared (IR) cameras) that capture views of the user's eyes 4092, one or more scene (visible light) cameras (e.g., RGB video cameras) that capture images of the real world environment in a field of view in front of the user (not shown), and one or more ambient light sensors that capture lighting information for the environment (not shown).

Figure 9:
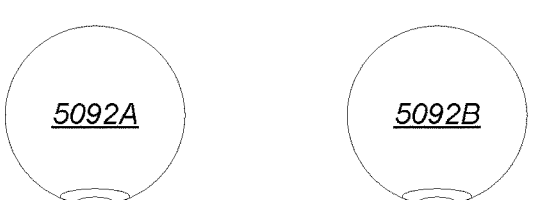
FIG. 9 is a block diagram illustrating an example system that may include components and implement methods as illustrated in FIGS. 1 through 6, according to some embodiments.
Figure 9:
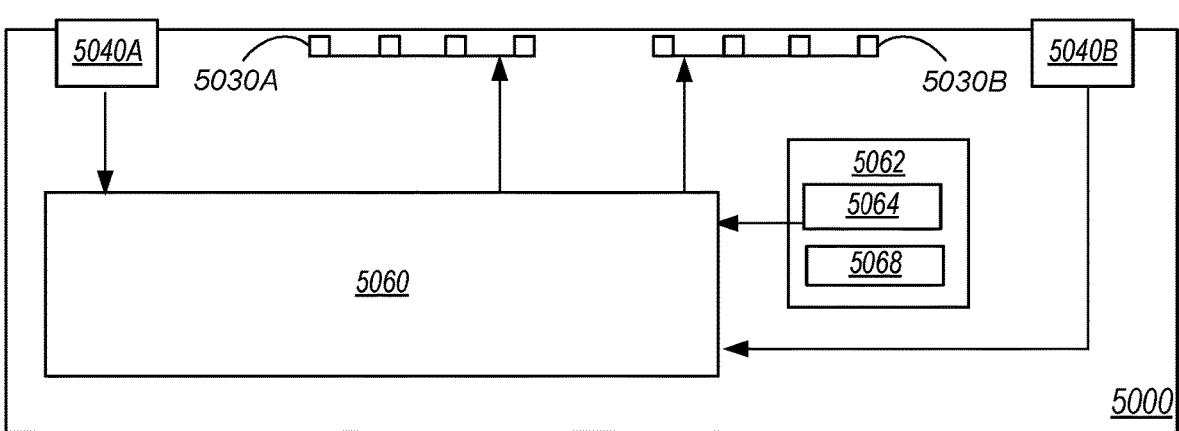

A controller 4060 for the MR system may be implemented in the HMD 4000, or alternatively may be implemented at least in part by an external device (e.g., a computing system) that is communicatively coupled to HMD 4000 via a wired or wireless interface. Controller 4060 may include one or more of various types of processors, image signal processors (ISPs), graphics processing units (GPUs), coder/decoders (codecs), and/or other components for processing and rendering video and/or images. Controller 4060 may render frames (each frame including a left and right image) that include virtual content based at least in part on inputs obtained from the sensors, and may provide the frames to the display. FIG. 9 further illustrates components of an HMD and MR system, according to some embodiments.

In some embodiments, an imaging system for the MR system may include, but is not limited to, one or more eye cameras 4040 and an IR light source 4030. IR light source 4030 (e.g., IR LEDs) may be positioned in the HMD 4000 (e.g., around the eyepieces, or elsewhere in the HMD 4000) to illuminate the user's eyes 4092 with IR light. At least one eye camera 4040 (e.g., an IR camera, for example a 400×400 pixel count camera or a 600×600 pixel count camera, that operates at 850 nm or 940 nm, or at some other IR wavelength or combination of wavelengths, and that captures frames, for example at a rate of 60-120 frames per second (FPS)), is located at each side of the user 4090's face. In various embodiments, the eye cameras 4040 may be positioned in the HMD 4000 on each side of the user 4090's face to provide a direct view of the eyes 4092, a view of the eyes 4092 through the eyepieces, or a view of the eyes 4092 via reflection off hot mirrors or other reflective components. Note that the location and angle of eye camera 4040 is given by way of example, and is not intended to be limiting. While FIG. 8 shows a single eye camera 4040 located on each side of the user 4090's face, in some embodiments there may be two or more eye cameras 4040 on each side of the user 4090's face.

A portion of IR light emitted by light source(s) 4030 reflects off the user 4090's eyes and is captured by the eye cameras 4040 to image the user's eyes 4092. Images captured by the eye cameras 4040 may be analyzed by controller 4060 to detect features (e.g., pupil and cornea features), position, and movement of the user's eyes 4092, and/or to detect other information about the eyes 4092 such as pupil dilation. An enrollment process as described herein may be executed by controller 4060 to generate models of the user's eyes. The eye models may then be used in other processes. For example, the point of gaze on the display may be estimated from eye tracking information using the eye models; the estimated point of gaze may be used to cause the scene camera(s) of the HMD 4000 to expose images of a scene based on a region of interest (ROI) corresponding to the point of gaze. As another example, the estimated point of gaze may enable gaze-based interaction with content shown on the display. As another example, in some embodiments, brightness of the displayed images may be modulated based on the user's pupil dilation as determined by the imaging system. The HMD 4000 may implement one or more of the methods as illustrated in FIGS. 1 through 6 to capture and process images of the user's eyes 4090 and generate eye models based on the captured images.

Embodiments of an HMD 4000 as illustrated in FIG. 8 may, for example, be used in augmented or mixed (AR) applications to provide augmented or mixed reality views to the user 4090. HMD 4000 may include one or more sensors, for example located on external surfaces of the HMD 4000, which collect information about the user 4090's external environment (video, depth information, lighting information, etc.); the sensors may provide the collected information to controller 4060 of the MR system. The sensors may include one or more visible light cameras (e.g., RGB video cameras) that capture video of the user's environment that may be used to provide the user 4090 with a virtual view of their real environment. In some embodiments, video streams of the real environment captured by the visible light cameras may be processed by the controller 4060 of the HMD 4000 to render augmented or mixed reality frames that include virtual content overlaid on the view of the real environment, and the rendered frames may be provided to the HMD 4000's display system.

FIG. 9 is a block diagram illustrating an example MR system that may include components and implement methods as illustrated in FIGS. 1 through 6, according to some embodiments. In some embodiments, a MR system may include an HMD 5000 such as a headset, helmet, goggles, or glasses. HMD 5000 may implement any of various types of display technologies. For example, the HMD 5000 may include a display system that displays frames including left and right images on screens or displays (not shown) that are viewed by a user through eyepieces (not shown). The display system may, for example, be a DLP (digital light processing), LCD (liquid crystal display), or LCoS (liquid crystal on silicon) technology display system. To create a three-dimensional (3D) effect in a 3D virtual view, objects at different depths or distances in the two images may be shifted left or right as a function of the triangulation of distance, with nearer objects shifted more than more distant objects. Note that other types of display systems may be used in some embodiments.

In some embodiments, HMD 5000 may include a controller 5060 configured to implement functionality of the MR system and to generate frames (each frame including a left and right image) that are provided to the HMD's displays. In some embodiments, HMD 5000 may also include a memory 5062 configured to store software (code 5064) of the MR system that is executable by the controller 5060, as well as data 5068 that may be used by the MR system when executing on the controller 5060. In some embodiments, HMD 5000 may also include one or more interfaces (e.g., a Bluetooth technology interface, USB interface, etc.) configured to communicate with an external device via a wired or wireless connection. In some embodiments, at least a part of the functionality described for the controller 5060 may be implemented by the external device. The external device may be or may include any type of computing system or computing device, such as a desktop computer, notebook or laptop computer, pad or tablet device, smartphone, handheld computing device, game controller, game system, and so on.

In various embodiments, controller 5060 may be a uniprocessor system including one processor, or a multiprocessor system including several processors (e.g., two, four, eight, or another suitable number). Controller 5060 may include central processing units (CPUs) configured to implement any suitable instruction set architecture, and may be configured to execute instructions defined in that instruction set architecture. For example, in various embodiments controller 5060 may include general-purpose or embedded processors implementing any of a variety of instruction set architectures (ISAs), such as the x86, PowerPC, SPARC, RISC, or MIPS ISAs, or any other suitable ISA. In multiprocessor systems, each of the processors may commonly, but not necessarily, implement the same ISA. In some embodiments, controller 5060 may be implemented as a system on a chip (SoC). For example, in some embodiments, processors, memory, I/O interface (e.g. a fabric), etc. may be implemented in a single SoC comprising multiple components integrated into a single chip. For example an SoC may include multiple CPU cores, a multi-core GPU, a multi-core neural engine, cache, one or more memories, etc. integrated into a single chip. In some embodiments, an SoC embodiment may implement a reduced instruction set computing (RISC) architecture, or any other suitable architecture. Controller 5060 may employ any microarchitecture, including scalar, superscalar, pipelined, superpipelined, out of order, in order, speculative, non-speculative, etc., or combinations thereof. Controller 5060 may include circuitry to implement microcoding techniques. Controller 5060 may include one or more processing cores each configured to execute instructions. Controller 5060 may include one or more levels of caches, which may employ any size and any configuration (set associative, direct mapped, etc.). In some embodiments, controller 5060 may include at least one graphics processing unit (GPU), which may include any suitable graphics processing circuitry. Generally, a GPU may be configured to render objects to be displayed into a frame buffer (e.g., one that includes pixel data for an entire frame). A GPU may include one or more graphics processors that may execute graphics software to perform a part or all of the graphics operation, or hardware acceleration of certain graphics operations. In some embodiments, controller 5060 may include one or more other components for processing and rendering video and/or images, for example image signal processors (ISPs), coder/decoders (codecs), etc.

Memory 5062 may include any type of memory, such as dynamic random access memory (DRAM), synchronous DRAM (SDRAM), double data rate (DDR, DDR2, DDR3, etc.) SDRAM (including mobile versions of the SDRAMs such as mDDR3, etc., or low power versions of the SDRAMs such as LPDDR2, etc.), RAMBUS DRAM (RDRAM), static RAM (SRAM), etc. In some embodiments, one or more memory devices may be coupled onto a circuit board to form memory modules such as single inline memory modules (SIMMs), dual inline memory modules (DIMMs), etc. Alternatively, the devices may be mounted with an integrated circuit implementing system in a chip-on-chip configuration, a package-on-package configuration, or a multi-chip module configuration.

In some embodiments, the HMD 5000 may include one or more sensors that collect information about the user's environment (video, depth information, lighting information, etc.). The sensors may provide the information to the controller 5060 of the MR system. In some embodiments, the sensors may include, but are not limited to, visible light cameras (e.g., video cameras) and ambient light sensors.

HMD 5000 may be positioned on the user's head such that the displays and eyepieces are disposed in front of the user's eyes 5092A and 5092B. IR light sources 5030A and 5030B (e.g., IR LEDs) may be positioned in the HMD 5000 (e.g., around the eyepieces, or elsewhere in the HMD 5000) to illuminate the user's eyes 5092A and 5092B with IR light. Eye cameras 5040A and 5040B (e.g., IR cameras, for example 400×400 pixel count cameras or 600×600 pixel count cameras that operate at 850 nm or 940 nm, or at some other IR wavelength, and that capture frames, for example at a rate of 60-120 frames per second (FPS)), may be located at each side of the user's face. In various embodiments, the eye cameras 5040 may be positioned in the HMD 5000 to provide a direct view of the eyes 5092, a view of the eyes 5092 through the eyepieces 5020, or a view of the eyes 5092 via reflection off hot mirrors or other reflective components. Note that the location and angle of eye cameras 5040A and 5040B is given by way of example, and is not intended to be limiting. In some embodiments, there may be a single eye camera 5040 located on each side of the user's face. In some embodiments, there may be two or more eye cameras 5040 on each side of the user's face. For example, in some embodiments, a wide-angle camera 5040 and a narrower-angle camera 5040 may be used on each side of the user's face. A portion of IR light emitted by light sources 5030A and 5030B reflects off the user's eyes 5092A and 5092B is received at respective eye cameras 5040A and 5040B, and is captured by the eye cameras 5040A and 5040B to image the user's eyes 5092A and 5092B. Eye information captured by the cameras 5040A and 5040B may be provided to the controller 5060. The controller 5060 may analyze the eye information (e.g., images of the user's eyes 5092A and 5092B) to determine eye position and movement and/or other features of the eyes 5092A and 5092B. In some embodiments, to accurately determine the location of the user's eyes 5092A and 5092B with respect to the eye cameras 5040A and 5040B, the controller 5060 may perform a 3D reconstruction using images captured by the eye cameras 5040A and 5040B to generate 3D models of the user's eyes 5092A and 5092B. The 3D models of the eyes 5092A and 5092B indicate the 3D position of the eyes 5092A and 5092B with respect to the eye cameras 5040A and 5040, which, for example, allows eye tracking algorithms executed by the controller to accurately track eye movement. The HMD 5000 may implement one or more of the methods as illustrated in FIGS. 1 through 6 to capture and process images of the user's eyes 5090 and generate the eye models based on the captured images.

The eye information obtained and analyzed by the controller 5060 may be used by the controller in performing various VR or AR system functions. For example, the point of gaze on the displays may be estimated from images captured by the eye cameras 5040A and 5040B and the eye models; the estimated point of gaze may be used to cause the scene camera(s) of the HMD 5000 to expose images of a scene based on a region of interest (ROI) corresponding to the point of gaze. As another example, the estimated point of gaze may enable gaze-based interaction with virtual content shown on the displays. As another example, in some embodiments, brightness of the displayed images may be modulated based on the user's pupil dilation as determined by the imaging system.

In some embodiments, the HMD 5000 may be configured to render and display frames to provide an augmented or mixed reality (MR) view for the user based at least in part according to sensor inputs. The MR view may include renderings of the user's environment, including renderings of real objects in the user's environment, based on video captured by one or more video cameras that capture high-quality, high-resolution video of the user's environment for display. The MR view may also include virtual content (e.g., virtual objects, virtual tags for real objects, avatars of the user, etc.) generated by MR system and composited with the displayed view of the user's real environment.

Embodiments of the HMD 5000 as illustrated in FIG. 9 may also be used in virtual reality (VR) applications to provide VR views to the user. In these embodiments, the controller 5060 of the HMD 5000 may render or obtain virtual reality (VR) frames that include virtual content, and the rendered frames may be displayed to provide a virtual reality (as opposed to mixed reality) experience to the user. In these systems, rendering of the VR frames may be affected based on the point of gaze determined from the imaging system.

Extended Reality

A real environment refers to an environment that a person can perceive (e.g. see, hear, feel) without use of a device. For example, an office environment may include furniture such as desks, chairs, and filing cabinets; structural items such as doors, windows, and walls; and objects such as electronic devices, books, and writing instruments. A person in a real environment can perceive the various aspects of the environment, and may be able to interact with objects in the environment.

An extended reality (XR) environment, on the other hand, is partially or entirely simulated using an electronic device. In an XR environment, for example, a user may see or hear computer generated content that partially or wholly replaces the user's perception of the real environment. Additionally, a user can interact with an XR environment. For example, the user's movements can be tracked and virtual objects in the XR environment can change in response to the user's movements. As a further example, a device presenting an XR environment to a user may determine that a user is moving their hand toward the virtual position of a virtual object, and may move the virtual object in response. Additionally, a user's head position and/or eye gaze can be tracked and virtual objects can move to stay in the user's line of sight.

Examples of XR include augmented reality (AR), virtual reality (VR) and mixed reality (MR). XR can be considered along a spectrum of realities, where VR, on one end, completely immerses the user, replacing the real environment with virtual content, and on the other end, the user experiences the real environment unaided by a device. In between are AR and MR, which mix virtual content with the real environment.

VR generally refers to a type of XR that completely immerses a user and replaces the user's real environment. For example, VR can be presented to a user using a head mounted device (HMD), which can include a near-eye display to present a virtual visual environment to the user and headphones to present a virtual audible environment. In a VR environment, the movement of the user can be tracked and cause the user's view of the environment to change. For example, a user wearing a HMD can walk in the real environment and the user will appear to be walking through the virtual environment they are experiencing. Additionally, the user may be represented by an avatar in the virtual environment, and the user's movements can be tracked by the HMD using various sensors to animate the user's avatar.

AR and MR refer to a type of XR that includes some mixture of the real environment and virtual content. For example, a user may hold a tablet that includes a camera that captures images of the user's real environment. The tablet may have a display that displays the images of the real environment mixed with images of virtual objects. AR or MR can also be presented to a user through an HMD. An HMD can have an opaque display, or can use a see-through display, which allows the user to see the real environment through the display, while displaying virtual content overlaid on the real environment.

There are many types of devices that allow a user to experience the various forms of XR. Examples include HMDs, heads up displays (HUDs), projector-based systems, smart windows, tablets, desktop or laptop computers, smart watches, earbuds/headphones, controllers that may include haptic devices, and many others. As mentioned above, an HMD, or any of the other devices listed above may include opaque displays (e.g. liquid crystal displays (LCDs), organic light emitting diode (OLED) displays or micro-LED displays) or see through displays. A see through display can have a medium through which light is directed to a user's eyes. The medium can include one or more of a waveguide, hologram medium, optical combiner, optical reflector and other optical components. An image can be generated and propagated through the medium using a display source such as OLEDs, micro-LEDs, liquid crystal on silicon (LCOS), a light scanner, digital light projection (DLP).

Devices for XR may also include audio output devices such as speakers to present audio (including spatial audio) to users, haptics devices to stimulate the user's sense of touch, and other devices to stimulate any of the user's senses. Additionally, the device may include numerous sensors, including cameras, microphones, depth sensors, eye tracking sensors, environmental sensors, input sensors, and other sensors to allow the device to understand the user and the real environment.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

What is claimed is:

1. A system, comprising:
one or more cameras configured to capture images of an eye;
a memory storing a set of eye models; and
a controller comprising one or more processors configured to:
    capture one or more images of the eye by the one or more cameras;
    determine one or more properties of the eye from the captured images;
    determine a best match eye model from the set of eye models, wherein the best match eye model is the eye model determined to be a best match to the eye based on assessment of the determined eye properties against eye properties of the eye models; and
    implement the best match eye model in a gaze tracking process in which features of the eye are derived from one or more images of the eye captured by the one or more cameras and a gaze direction is estimated based on the derived features and the implemented best match eye model.

2. The system of claim 1, wherein the controller is configured to implement the best match eye model in the gaze tracking process when the best match eye model satisfies a threshold.

3. The system of claim 1, wherein the best match eye model is the eye model with a highest matching score that satisfies a threshold.

4. The system of claim 3, wherein a matching score for the eye model is determined based on residual errors between the eye properties of the eye model and the eye properties of the eye determined from the captured images.

5. The system of claim 1, wherein the controller is further configured to implement an eye model enrollment process when the best match eye model does not satisfy a threshold.

6. The system of claim 1, wherein the controller is configured to determine the best match eye model in the set of eye models in response to detecting a presence of the eye in the captured images.

7. The system of claim 1, wherein the one or more properties of the eye determined from the captured images include eye features.

8. The system of claim 7, wherein the one or more processors are configured to:
    determine two or more eye poses from two or more images captured of the eye in different orientations by the one or more cameras, wherein an eye pose indicates a current eye location and orientation with respect to the one or more cameras; and
    calculate the eye features based at least in part on two or more eye poses.

9. The system of claim 7, wherein the eye features include cornea contour and pupil features of the eye.

10. The system of claim 1, wherein the system is a head-mounted device (HMD), a handheld device, or a wall-mounted device.

11. The system of claim 1, further comprising:
one or more second cameras configured to capture images of a second eye;
wherein the controller is further configured to:
    capture one or more second images of the second eye by the second cameras;
    determine one or more properties of the second eye from the captured second images;
    determine a best match second eye model in the set of eye models, wherein the best match second eye model is the eye model determined to be a best match to the second eye based on assessment of the determined second eye properties against eye properties of the eye models;
    and implement the best match second eye model in a second gaze tracking process in which features of the second eye are derived from one or more second images of the second eye captured by the one or more second cameras and a second gaze direction is estimated based on the derived features and the implemented best match second eye model.

12. A method, comprising:
capturing one or more images of an eye using one or more cameras positioned in front of the eye, the cameras being located on an apparatus configured to be positioned proximate a head;
determining, by a computer processor coupled to the head-mounted apparatus, one or more features of the eye from the captured images;
determining, by the computer processor, a matching score for each eye model in a set of eye models stored in a memory coupled to the computer processor, wherein the matching score is determined from a comparison of the determined eye features from the captured images and eye features in the eye model;
determining, by the computer processor, a best match eye model from the set of eye models, wherein the best match eye model is the eye model determined to have a highest matching score; and
implementing, by the cameras in the apparatus, a gaze tracking process, wherein the gaze tracking process utilizes the best match eye model, and wherein the gaze tracking process derives features of the eye from one or more images of the eye captured by the one or more cameras and a gaze direction is estimated based on the derived features and the best match eye model.

13. The method of claim 12, further comprising utilizing the best match eye model in the gaze tracking process when a matching score of the best match eye model satisfies a threshold.

14. The method of claim 12, wherein the eye features include cornea contour and pupil features of the eye.

15. The method of claim 12, wherein the matching score for each eye model is determined based on residual errors between the eye features in the eye model and the eye features determined from the captured images.

16. The method of claim 12, wherein determining the one or more features of the eye from the captured images includes:

determining two or more eye poses from two or more captured images of the eye in different orientations, wherein an eye pose indicates a current eye location and orientation with respect to the one or more cameras; and calculating the eye features based at least in part on two or more eye poses.

17. A system, comprising:

one or more cameras configured to capture images of a right eye and a left eye;

a memory storing a set of eye models for the right eye and the left eye; and a controller comprising one or more processors configured to:

capture one or more images of the right eye and the left eye by the one or more cameras;

determine one or more eye features of the right eye from the captured images;

determine a first matching score for each eye model for the right eye in the set of eye models, wherein the matching score is determined from a comparison of the determined eye features of the right eye from the captured images and eye features of the right eye in the eye model;

determine a best match eye model for the right eye from the set of eye models, wherein the best match eye model for the right eye is the eye model determined to have a highest first matching score;

implement a first gaze tracking process for the right eye utilizing the best match eye model for the right eye, wherein the first gaze tracking process derives features of the right eye from one or more images of the right eye captured by the one or more cameras and a gaze direction is estimated based on the derived features and the best match eye model for the right eye;

determine one or more eye features of the left eye from the captured images;

determine a second matching score for each eye model for the left eye in the set of eye models, wherein the matching score is determined from a comparison of the determined eye features of the left eye from the captured images and eye features of the left eye in the eye model;

determine a best match eye model for the left eye from the set of eye models, wherein the best match eye model for the left eye is the eye model determined to have a highest second matching score; and implement a second gaze tracking process for the left eye utilizing the best match eye model for the left eye, wherein the second gaze tracking process derives features of the left eye from one or more images of the left eye captured by the one or more cameras and a gaze direction is estimated based on the derived features and the best match eye model for the left eye.

18. The system of claim 17, wherein the one or more cameras includes at least a first camera and a second camera, the first camera being configured to capture a first image of the right eye and the second camera being configured to capture a second, separate image of the left eye.

19. The system of claim 17, further comprising an illumination source comprising a plurality of light-emitting elements configured to emit light towards the right eye and the left eye to be imaged by the camera.

20. The system of claim 19, wherein the light-emitting elements include infrared (IR) light sources, and wherein the one or more cameras are infrared cameras.

\* \* \* \* \*